United States Patent [19]
Jendrisak et al.

[11] 3,800,477
[45] Apr. 2, 1974

[54] APPARATUS FOR SEAMING THE EDGES OF GLASS SHEETS

[76] Inventors: Joseph E. Jendrisak, 986 Grace St., Northville, Mich. 48167; Harold E. McKelvey, 14934 Maplewood Ln., Plymouth, Mich. 48170

[22] Filed: Jan. 14, 1972

[21] Appl. No.: 217,738

Related U.S. Application Data

[63] Continuation-in-part of Ser. No. 91,967, Nov. 23, 1970, abandoned.

[52] U.S. Cl. .................... 51/139, 51/140, 51/147, 51/283
[51] Int. Cl. .......................................... B24b 21/16
[58] Field of Search ............ 51/137, 138, 139, 140, 51/147, 283

[56] References Cited
UNITED STATES PATENTS

| | | | |
|---|---|---|---|
| 1,365,583 | 1/1921 | Brown.................................. | 51/147 |
| 2,637,951 | 5/1953 | White .................................. | 51/140 |
| 2,837,876 | 6/1958 | Kocher ................................ | 51/140 |
| 2,969,624 | 1/1961 | Castine et al......................... | 51/137 |
| 3,624,965 | 12/1971 | Gepfert................................ | 51/138 X |

Primary Examiner—Donald G. Kelly
Assistant Examiner—Howard N. Goldberg
Attorney, Agent, or Firm—William E. Nobbe

[57] ABSTRACT

Apparatus for seaming glass sheets having curved or irregular edges precut to the desired outline. The glass sheets are conveyed along a substantially horizontal path between two pairs of seaming units located at opposite sides of said path. Each unit employs an endless, flexible, abrasive belt disposed transversely at an angle to the conveyor means. The belt of one unit of each pair engages the upper corner of the adjacent peripheral edge of the glass sheet, while the belt of the other unit of the same pair engages the lower corner of the same edge of said sheet. The inner loop of the belt is trained about a pulley mounted to rotate about a substantially horizontal axis, while the outer loop of said belt is trained about a pulley driven about an axis inclined to the vertical. Each unit is mounted to swing as a pendulum toward and away from the path of travel of the glass sheets to follow the outline of said sheets, while the belt thereof is free to slide simultaneously along said inclined pulley, said movements of the belt being initiated and controlled by the upward thrust of the glass sheets upon the belt as said sheets move progressively past the same.

21 Claims, 21 Drawing Figures

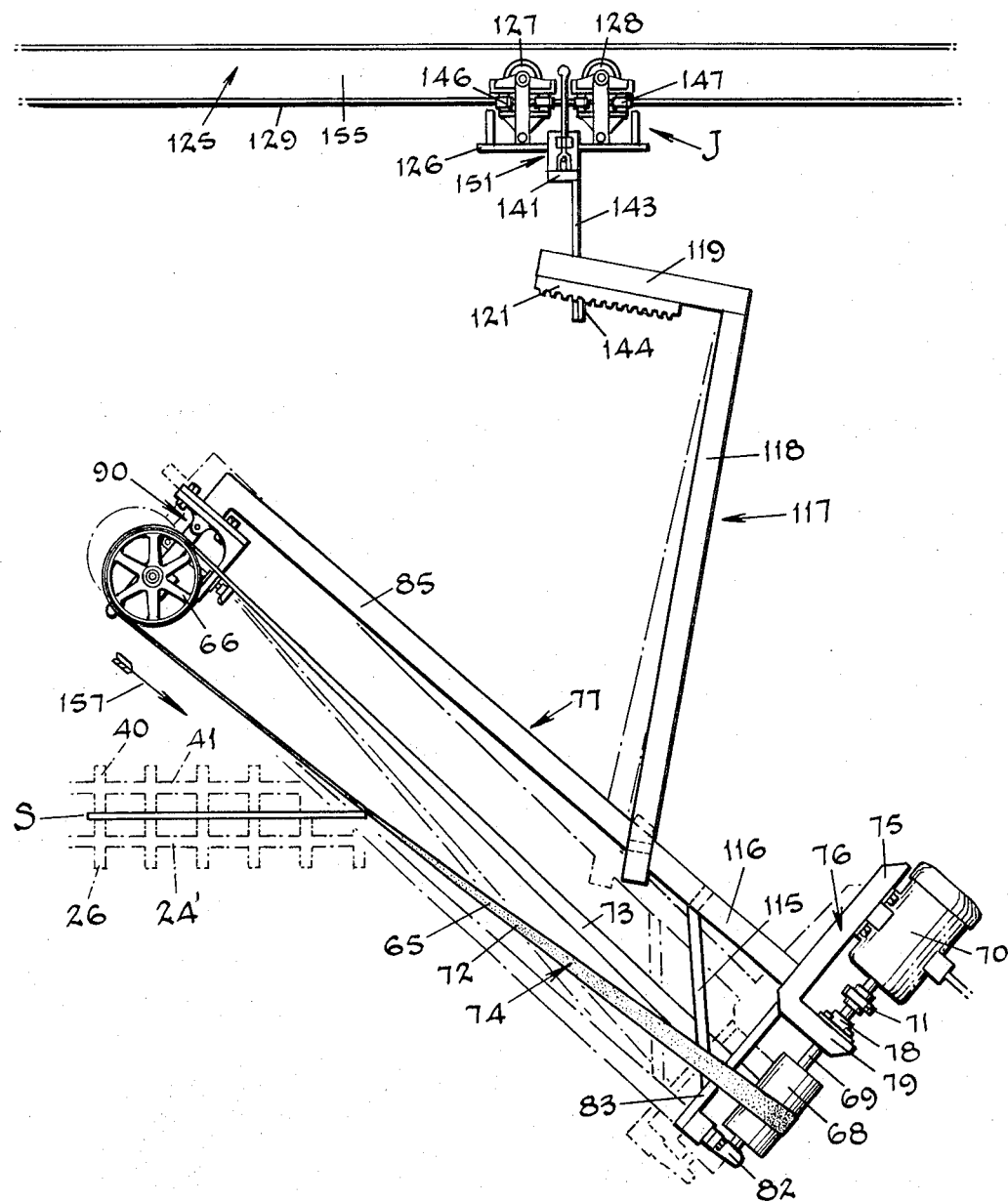
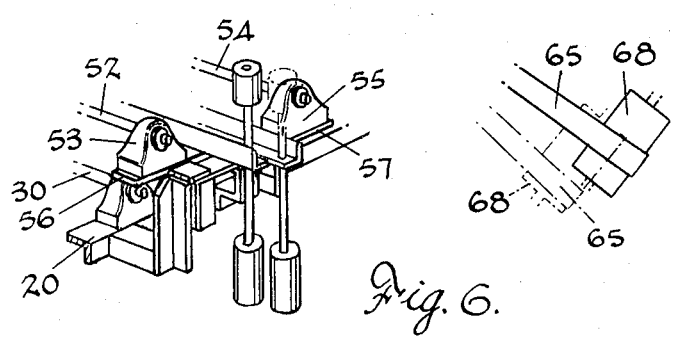
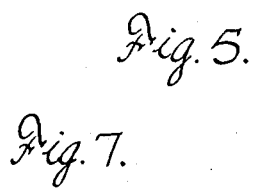
Fig. 5.
Fig. 7.
Fig. 6.

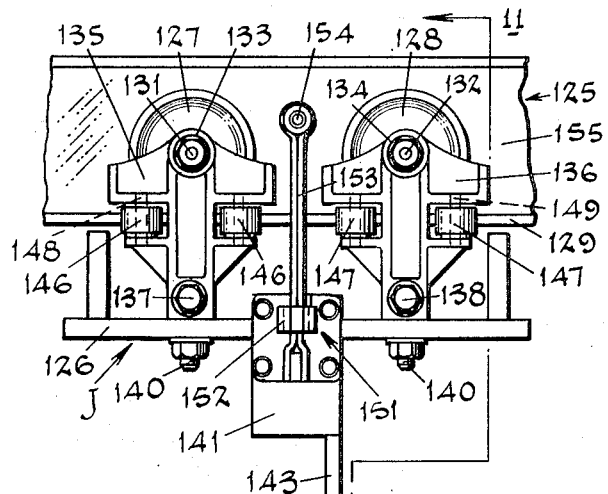
*Fig. 10.*
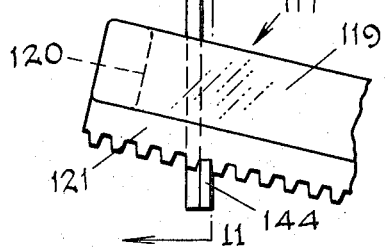
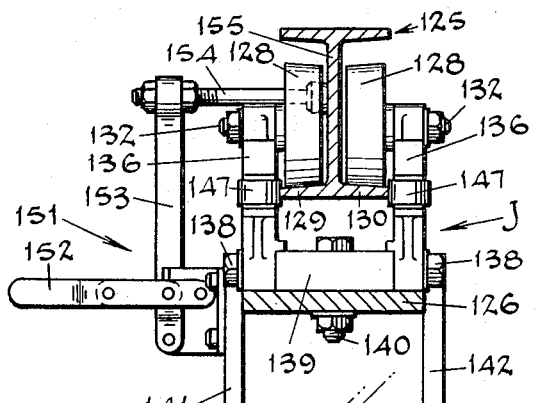
*Fig. 11.*
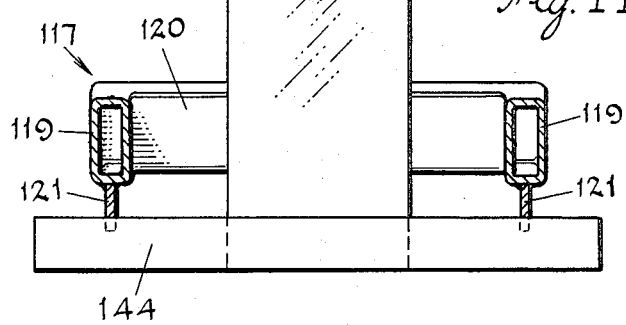
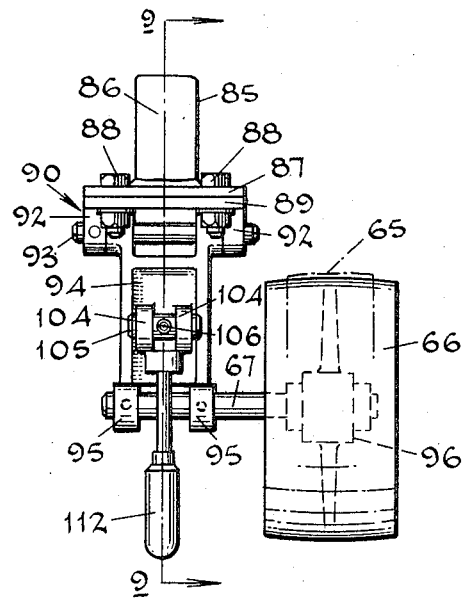
*Fig. 8.*
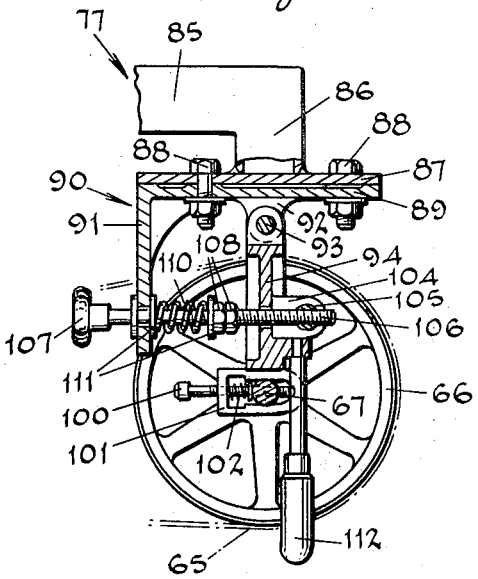
*Fig. 9.*

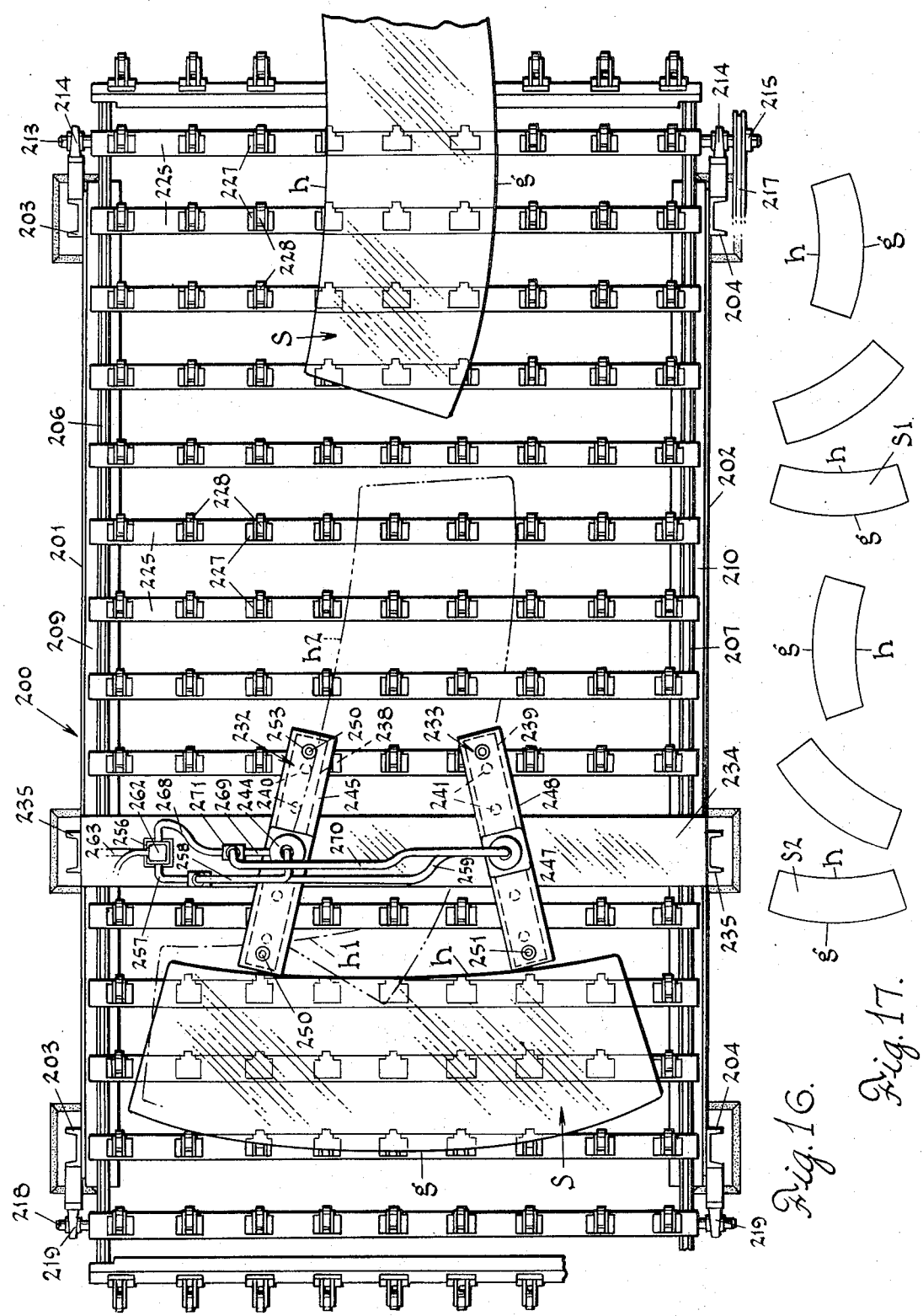

APPARATUS FOR SEAMING THE EDGES OF GLASS SHEETS

This application is a Continuation-in-Part of application, Filed Nov. 23, 1970, Ser. No. 91,967 (allowed Oct. 20, 1971) now abandoned.

BACKGROUND OF THE INVENTION

The present invention relates to the edge seaming of glass sheets — and more particularly to apparatus for seaming the curved or irregular peripheral edges of glass sheets precut to their desired outline.

The apparatus of this invention finds particular use in the production of laminated automotive windshields, or the like, wherein, for example, pairs of glass sheets are cut to matching outlines, washed, dried and each pair stacked on a bending mold for transport through a tunnel-like bending furnace wherein the glass is bent to the desired shape. After bending, the sheets of each pair are separated and a sheet of thermoplastic material is inserted as an interlayer therebetween to form a glass-plastic sandwich assembly. This latter assembly is then laminated with heat and pressure, to form the ultimate product to be installed in a frame to serve as an automotive windshield, or the like.

Unless the raw edges of the cut glass sheets are seamed, the edges remain so sharp that operating personnel and others handling the sheets, such as those who install the ultimate product, are likely to be cut. Seaming by moving an abrasive surface against the edges of the precut sheets has been found to eliminate the sharp edges. This is also important in that, otherwise, there would be a tendency for small particles or chips of glass to spall off from the raw cut edges of the glass sheets and find their way between the two sheets during bending resulting in the sheets being fused together. It is well known that in the bending operation, the glass sheets draw apart or separate slightly during the preheating cycle and tend to draw the small particles or chips of glass between the sheets, resulting in defects in the ultimate product. Seaming of the glass sheet edges also reduces thermal shock and breakage of the sheets during bending.

It is therefore an aim of this invention to provide improved apparatus for seaming the cut edges of the glass sheets rapidly and efficiently and in a continuous manner.

Another object of the invention is to provide seaming apparatus embodying a plurality of seaming units arranged at opposite sides of means for conveying the glass sheets to be seamed along a substantially horizontal path, said units operating independently of one another and each unit being mounted for bodily swinging movement about a substantially horizontal axis during seaming of the sheet edges to automatically adjust itself to the outlines of said edges.

Another object of the invention is to provide a plurality of such seaming units, each employing an endless, flexible, abrasive belt for performing the seaming operation, and means for mounting the belt whereby, upon bodily swinging movement of the unit as the belt follows the outline of the sheet, the said belt will also be subjected to a second movement independently of said swinging movement, said combined movements of the belt being initiated and controlled by the upward thrust of the glass sheet upon said belt.

A further object of the invention is to provide in such seaming apparatus, means for mounting the endless flexible abrasive belt of each unit including a pulley mounted to rotate about a substantially horizontal axis and about which the inner loop of the belt is trained and a second pulley mounted to rotate about an axis inclined to the vertical and about which the opposite loop of the belt is trained, the said belt being free to slide along said second pulley simultaneously with and independently of the bodily swinging movement thereof whereby to effect a uniform seaming of the sheet edge.

A further object of the invention is to provide, in seaming apparatus of the above character, at least one pair of seaming units at each side of the path of travel of the glass sheets, with the endless abrasive belts thereof being disposed transversely at an angle to the conveyor means, the belt of one unit being adapted to grind the upper corner of the adjacent peripheral edge of the sheet and the belt of the second unit of said pair being adapted to grind the lower corner of said edge, and means for driving the belts such that the working run of the first belt moves downwardly and outwardly away from the sheet, while the working run of the second belt moves upwardly and outwardly relative to the sheet to obtain uniformily smoothe corners free of sharp edges while at the same time, carrying the particles of glass removed from the sheet edges away from the major surfaces of the sheet.

A still further object of the invention is to provide means for mounting the seaming units so that they are readily adjustable to the seaming of glass sheets of varying size and different outlines and also whereby the orientation of the endless belts with respect to the edges of the glass sheets may be readily varied.

DESCRIPTION OF THE DRAWINGS

A typical embodiment of the present invention will be described for purposes of illustration rather than limitation. In the drawings which form part of the description of this embodiment and wherein like reference numerals refer to like structural elements:

FIG. 5 is a side elevation of one of the seaming units, FIG. 6 is a fragmentary perspective view of a portion of the conveyor, FIG. 7 is a diagrammatic view of one of the driving pulleys indicating the sliding action of the abrasive belt along said pulley, FIG. 8 is a detail view of the mounting for the idler pulley, FIG. 9 is a transverse, vertical section taken on line 9—9 of FIG. 8, FIG. 10 is a detail view of the support carriage for a seaming unit, FIG. 11 is a transverse, vertical section taken on line 11—11 of FIG. 10, FIG. 16 is a plan view of the sheet turning apparatus of this embodiment for orienting the glass sheets to place other edges thereof in position for seaming, FIG. 17 is a diagrammatic plan view showing the manner in which succeeding glass sheets are turned in opposite directions.

DESCRIPTION OF THE PREFERRED EMBODIMENT

Figure 1:
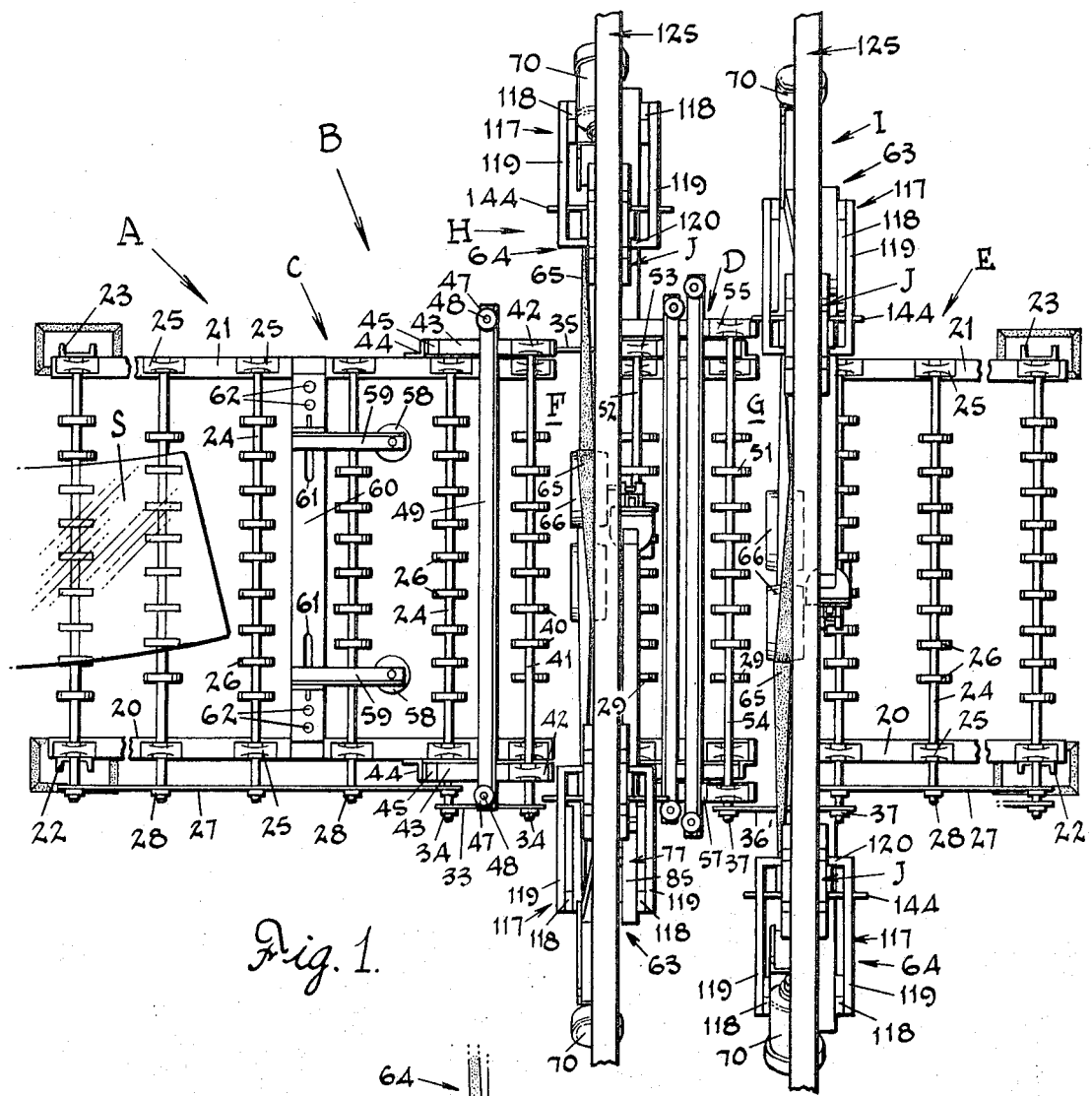
FIG. 1 is a plan view of seaming apparatus constructed in accordance with this invention.
Figure 12:
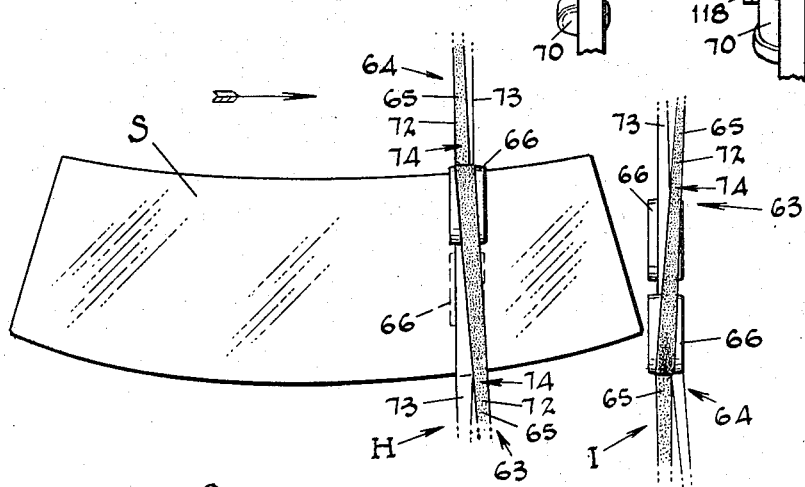
FIG. 12 is a diagrammatic view of a glass sheet and the relative positions of the seaming units.
Figure 2:
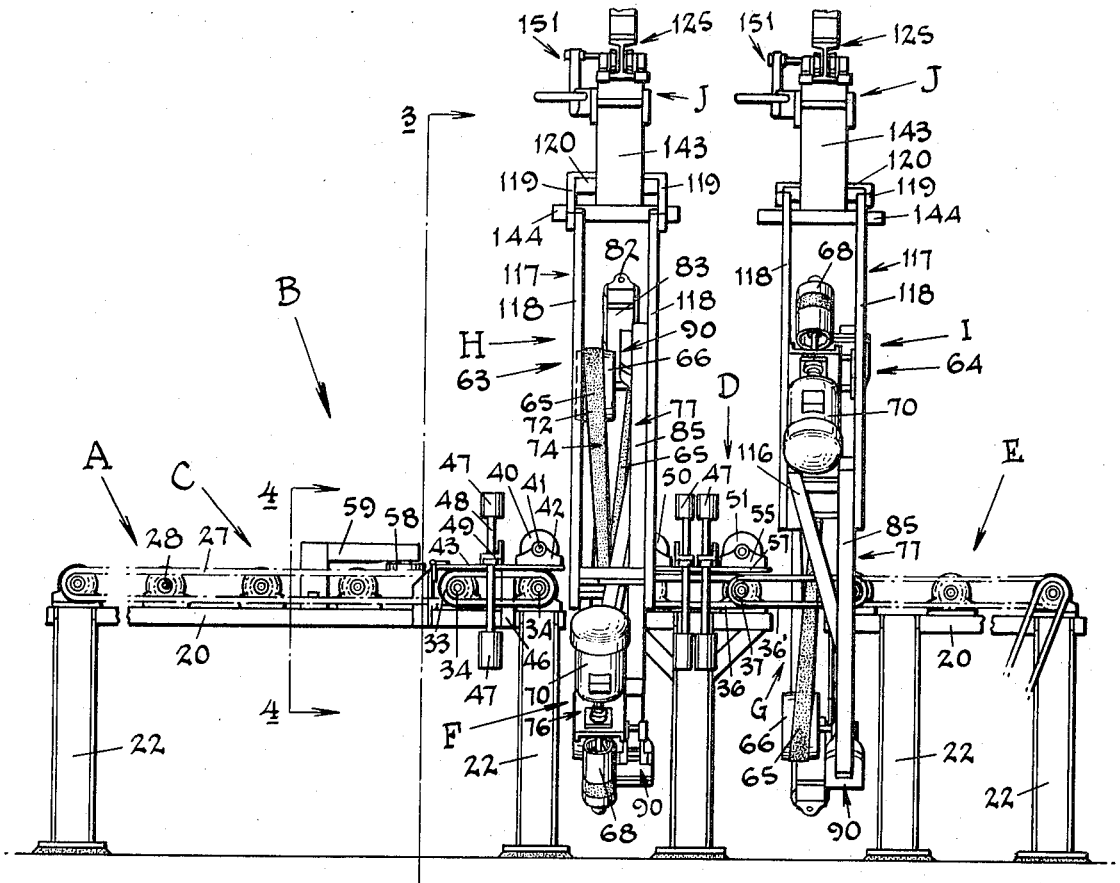
FIG. 2 is a side elevation of the apparatus.

Referring now to the drawings and particularly to FIGS. 1 and 2, the apparatus of this invention comprises a conveyor means A for conveying the glass sheets S to be seamed along a definite horizontal path to and through the seaming apparatus B.

The conveyor means A includes three sections C, D and E, arranged in spaced end to end relation. The first or receiving conveyor section C and the third or exit conveyor section E are of substantially the same construction, each comprising two spaced, parallel, horizontal rails 20 and 21 supported at their opposite ends by posts 22 and 23. Extending transversely between the rails 20 and 21 are a plurality of shafts 24, journaled at their opposite ends in bearings 25 carried by said rails and having fixed thereto a plurality of spaced disks 26 for supporting and conveying the glass sheets. The shafts 24 of each conveyor section C and E may be driven in any suitable manner, such as by an endless chain 27 trained over sprocket gears 28 keyed to one end of the shafts 24 and connected by suitable means to a drive motor (not shown).

The middle or intermediate conveyor section D is spaced from both the entry and exit conveyor sections C and E to provide open areas F and G for receiving the seaming apparatus B. The intermediate conveyor section D is constructed in much the same way as conveyor sections C and E in that it also includes spaced disks 29 fixed to transverse shafts 30 for receiving the glass sheets from conveyor section C and delivering them to conveyor section E.

The inner endmost shaft 24' of the receiving conveyor section C is driven by chain 33 trained about sprocket gears 34 (FIG. 1) on shaft 24' and the next adjacent shaft. From the opposite end of this shaft 24', the adjacent shaft 30 of the middle conveyor section D is driven by a chain 35 (FIG. 1). The shaft 30 then drives the associated shaft 30' by means of a chain 36, and a chain 36' trained about sprocket gears 37, one of which is mounted on the adjacent or first shaft 24 of the exit conveyor section E.

Above the disks 26 on the shaft 24' of receiving conveyor section C and the disks 29 on the shafts 30 of middle conveyor section D, there are provided disks that are adapted to hold the glass sheets S firmly on the disks 26 and 29 therebelow. Thus, a plurality of disks 40 are fixed on a transversely disposed shaft 41 journaled at its ends in bearings 42. Each bearing 42 is carried by a plate 43 pivoted on a post 44 on the rails 20 and 21 by a hinge 45. The plates 43 are supported by posts 46 to maintain the disks 40 in light rolling contact with the disks 26. Adjustable weights 47 on rods 48, supported on a brace 49, serve to afford a suitable degree of downward thrust on the plates 43.

"Hold-down" disks 50 and 51 are also positioned above the disks 29 on the shafts 30 of conveyor section D, the disks 50 being fixed on a shaft 52 journaled at its ends in bearings 53. Similarly, the disks 51 are mounted on a shaft 54 journaled in bearings 55. The bearings 53 are mounted on plates 56, while the bearings 55 are carried by plates 57. The plates 56 and 57 are pivotally supported in the same manner as the afore-mentioned plates 43. However, as illustrated in FIG. 6, to accomodate the associated weights, the plates 57, in each case are located outwardly of the plates 56. With this relationship of the hold-down disks 40, 50 and 51, the glass sheets will be firmly held against inadvertent lateral slipping while being acted upon by the seaming devices H and I of the apparatus B.

Each glass sheet S, as it traverses the receiving conveyor section C, is carried between a pair of guide rollers 58 that are substantially equally spaced, in transverse relation, from the longitudinal axis of the conveyor A. The rollers 58 are supported by brackets 59 on a transverse bar 60 which is secured at its ends to the rails 20 and 21. The bar 60 is formed with aligned slots 61 (FIG. 1) through which bolting means 62 are passed to lock each bracket 59 in desired position to accomodate glass sheets of different widths.

The seaming apparatus B comprises a pair of seaming devices H and I, located at each side of the conveyor and positioned to operate within the open areas F and G of the conveyor means. Each pair of seaming devices includes two seaming units 63 and 64, one being adapted to seam the upper corner of the adjacent peripheral edge of the glass sheet and the other the lower corner of the same edge of the sheet, as will be more fully hereinafter described.

Figure 3:
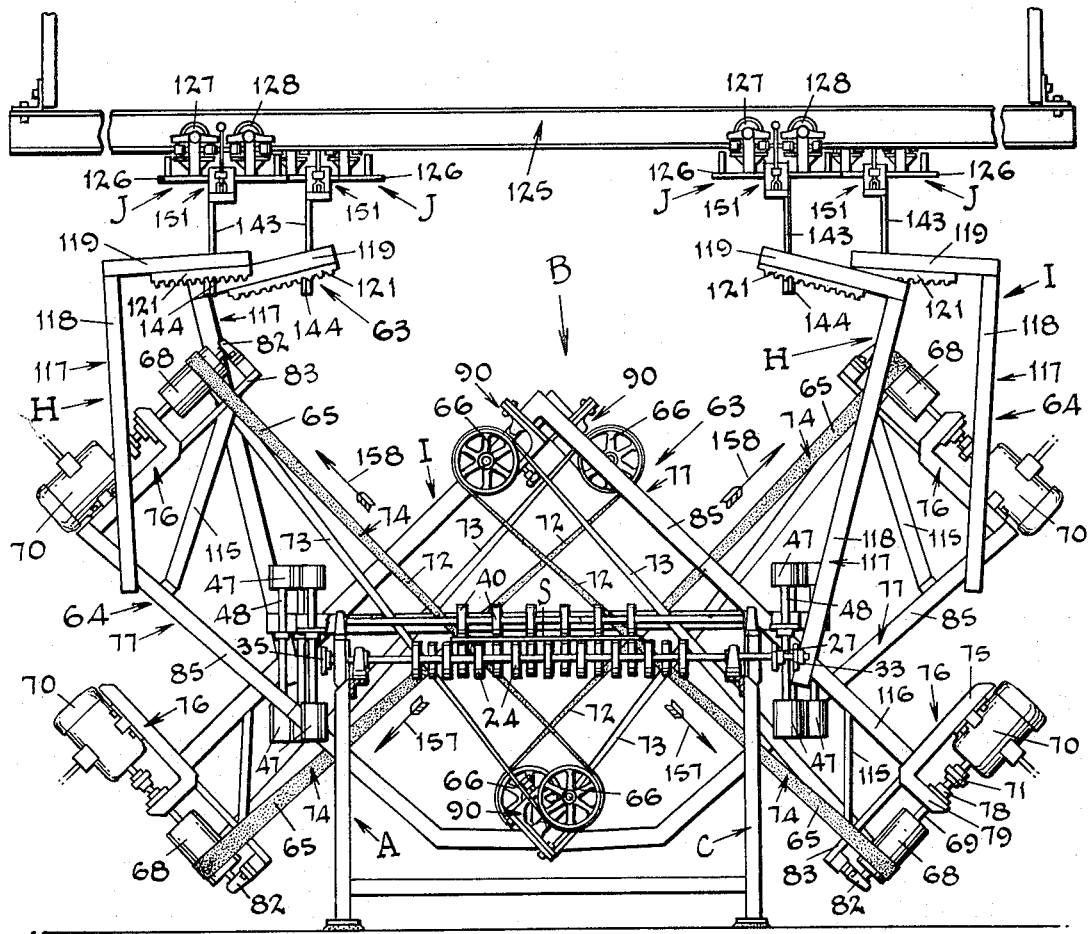
FIG. 3 is a transverse, vertical section taken on line 3—3 of FIG. 2.
Figure 4:
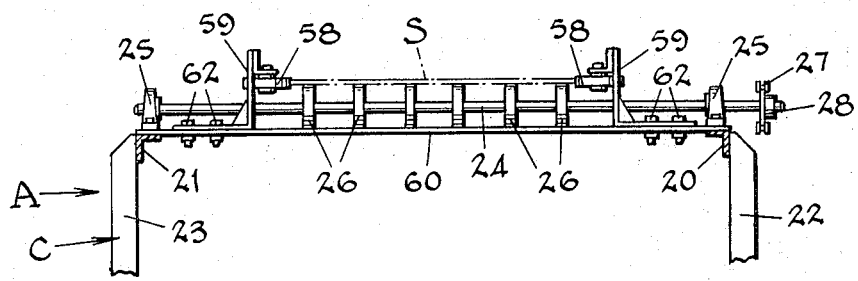
FIG. 4 is a transverse, vertical section taken on line 4—4 of FIG. 2.

With particular reference to FIGS. 1, 3 and 5, each seaming unit employs an endless, flexible abrasive belt 65 for performing the seaming operation. The inner loop of the belt is trained about a pulley 66 fixed to a horizontal shaft 67 vertically spaced from the conveyor A inwardly of the side edges thereof, while the outer loop of the belt is trained about a pulley 68 keyed to a shaft 69 located at the side of the conveyor and arranged at an angle inclined to the vertical. The pulley 66 is ordinarily an idler pulley, while pulley 68 is driven from a motor 70 connected to the pulley shaft 69 by a suitable coupling 71.

The belt 65 may be of canvas or other tough, flexible material trained about the spaced pulleys 66 and 68 to provide a working run 72 and a return run 73, and has its outside surface 74 coated with a suitable abrasive. Abrasive belts of this general character have previously been used to grind the edges of glass sheets and it is customary to effect the grinding action by bringing an edge of a glass sheet to be ground into grinding engagement with the working run of the belt.

The motor 70 is mounted on the leg 75 of an L-shaped bracket 76 forming an integral part of a structural frame 77, while the pulley shaft 69 is journaled in a bearing 78 at one end in the leg 79 of said L-shaped bracket. The opposite end of shaft 69 is journaled in a bearing 82 secured to the outer end of an arm 83 which is attached at its opposite end to the said L-shaped bracket 76.

The abrasive belt support means also includes an elongated support bar or "boom" 85, forming a part of the structural frame 77, and secured at one end to the L-shaped bracket 76, the opposite end of said bar being turned at right angles as at 86 (FIGS. 8 and 9) and having formed integral therewith a flat plate 87. Secured to the bottom of the plate 87, by bolts 88, is the base 89 of a mounting bracket 90 for supporting the idler pulley 66.

The bracket 90 includes a wall 91 from the base 89 and has a pair of transversely spaced ears 92 in which are carried the ends of a support axle 93. The axle 93 carries an arm 94 having lugs 95 formed at its opposite or free end. The pulley 66 is carried on the shaft 67 by means of bearings contained in the hub 96 (FIG.8). As shown in FIG. 9, each lug 95 is formed with an opening 97 through which the shaft 67 for the pulley 66 is passed. The ends of this shaft are adapted to be shifted relative to one another to initially locate the pulley 66, or otherwise adjust the same, in order that the inner loop of the abrasive belt 65 will be maintained in a "centered" running position on the pulley. To this end, a bolt 100 is threaded through wall 101 of each lug 95 and the shaft 67 whereby, with the coaction of a spring 102, rotation of one bolt in one direction will compress the associated spring while contra-turning of the other bolt will allow expansion of the related spring.

The arm 94 also serves to obtain the desired degree of working tautness in the belt and to permit convenient removal and replacement of said belt. For this purpose, the arm 94 is additionally formed with spaced ears 104 in which a rod 105 is supported. This rod is cross-drilled and threaded for a bolt 106. The bolt, passing freely through arm 94 and the wall 91 as well, is equipped with a handle 107 and, between said arm and wall, carries a pair of lock nuts 108. Normal expansion of coil spring 110, bearing by washers 111, against the wall 91 and nuts 108, tends by bolt 106 and rod 105, to urge the arm in such direction as to produce tightening of the belt. Through the use of a handle 112, the arm 94 is caused to swing reversely against the action of the spring 110, thereby producing a slack in the abrasive belt to facilitate its removal from the pulley 66.

The boom or bar 85 of the frame structure 77 is reinforced toward the arm 83 by a strut 115 and additionally by a diagonally disposed brace 116 from the bracket 76.

Fixed to the support bar 85 and the brace 116 adjacent the bracket 76, is one end of a substantially vertical hanger member 117, having parallel legs 118, the upper ends of which are formed integrally with legs 119 extending at right angles thereto and connected by a cross-bar 120. The under surface of each leg 119 is equipped with a length of gear rack 121. The hanger member 117 is suspended from a support carriage J hung from the horizontal I-beam 125 mounted transversely above the conveyor A from overhead beams or the like.

The supporting carriage J is best shown in FIGS. 10 and 11, and comprises a base plate 126 on which are mounted two spaced pairs of rollers 127-128 riding on the flanges 129-130 respectively, of I-beam 125. The rollers 127-128 are fixed to stub shafts 131-132 respectively, journaled in bearings 133-134 located in the side members 135—136 supported on the base 126. The side members 135-136 are secured by bolts 137-138 to a bar 139 each of which is secured by a bolt 140 to the base plate 126. Between the side plates 141-142 of the base plate 126 is located a vertically disposed plate 143 having a horizontal bar 144 at the lower end thereof extending outwardly from both sides.

In mounting the hanger member 117, selected teeth of the gear rack 121 are engaged with the end of the bar 144 such that the hanger members 117 will be suitably balanced to dispose the respective frame 77 at the proper angle for orientation of the abrasive belt 65 with respect to the corner of the glass sheet. In this regard, it is to be noted that, as in FIG. 5, while the belts are actively engaged with the corners of the sheet edges, the frames 77, in their entirety will be free to swing as a pendulum, with the bar 144 serving as a fulcrum.

The carriages J are movable along the I-beams 125 by the pairs of rollers 127-128 and are guided by pairs of rollers 146-147 on shafts 148-149 carried by the side members 135-136. The rollers 146-147 are in rolling contact with the edge surfaces of the flanges 129-130 of the I-beam 125. The carriages J are locked against movement by toggle clamps 151, each having a handle 152 which operates a clamping lever 153 to secure the carriage by means of a bolt 154 when engaged with the web 155 of I-beam 125. When it becomes necessary to move the seaming devices closer to, or away from, the conveyor according to the width of the glass sheets to be seamed, the handles 152 produce swinging of the clamping levers 153 whereby the bolts 154 will be released from engagement with the web 155 of I-beam 125 to permit movement of the carriages J.

Figure 14:
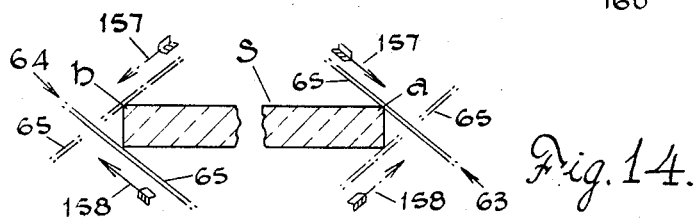
FIG. 14 is a further diagrammatic view showing the relative operative positions of the abrasive belts with respect to the edges of the glass sheet.

When seaming glass sheets, the sheets are moved horizontally onto the entry section C of the conveyor A (usually from a cutting machine or a washing machine) and thence forwardly between the two pairs of seaming units H and I. As best shown in FIGS. 3 and 14, as the glass sheet passes between the seaming units, the upper and lower corners of the adjacent peripheral edge A of the sheet is engaged by the working runs 72 of the belts 65 of the seaming units 63, while the upper and lower corners of the opposite peripheral edge B of the sheet are engaged by the belts of seaming units 64. The abrasive belts are normally positioned at an acute angel with respect to the edges of the glass sheets by the balacing action determined by the location of the supporting gear racks 121 of hanger members 117 on the bars 144. The belts are thus normally urged into engagement with the sheet edges by the hanger members which are free to swing as a pendulum about a horizontal axis defined by the teeth of the gear racks 121.

The belts are driven in the directions indicated by the arrows 157 and 158, also shown in FIGS. 3 and 14. More particularly, the belts are driven in such directions that the working runs of the belts engaging the upper corners of the sheet edges *a* and *b* move downwardly and outwardly away from the sheet, while the working runs of the belts engaging the lower corners of the sheet edges move upwardly and outwardly away from the sheet. As a result, as the belts grind succeeding portions of the sheet edges, as the sheets pass therebetween, they will effectively remove the sharp corners thereof to present smooth angle surfaces so that the glass sheets can be manually handled with minimum liability of scratching or cutting the hands of the operators. Likewise, by driving the belts in the directions described above, they will serve to carry away the ground glass particles so that danger of them becoming attached to the surfaces of the glass sheets will be minimized. Further seaming of the sheet edges reduces the liability of breakage of the glass sheets during bending as well as minimizing spalling and chipping of the sheet edges with consequent damage to the glass sheets.

Figure 13:
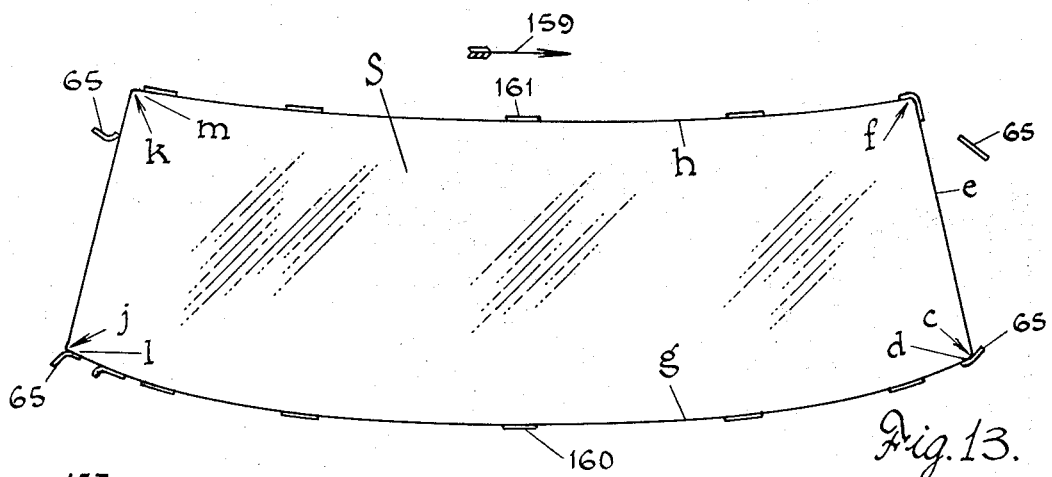
FIG. 13 is a similar view of a glass sheet showing the way in which the abrasive belts engage and move along opposite edges of the sheet.

The arrangement of the abrasive belts not only facilitates grinding of the longitudinal side edges of the glass sheets but also permits grinding of the front and rear corner areas thereof as the said sheets pass between the seaming units. This is due to the fact that the belts, in passing around the two pulleys 66 and 68 are cross-lapped so that the working faces of the working runs of the belts are normally disposed diagonally of the path of travel of the sheets as shown in FIG. 13. This initial positioning of the belts with respect to the glass sheets also greatly facilitates separation of the belts of opposing units by the sheets as they move forward to engage the belts, thereby permitting easy entry of the sheets between the belts.

As the glass sheet moves forwardly as indicated by the arrow 159, on the conveyor, the angled width of the working runs of the belts 65 of units 63 will be contacted first by the curved corner area $c$ causing the flexible belts to conform to said curved corner area, as indicated at $d$ in FIG. 13. This will be true whether the corner is curved, as shown, or sharp. As the sheet moves on, the belts 65 of units 64 will be initially engaged by the forward edge $e$ of the sheet and will then slide along said edge to engage the corner area $f$ of the sheet. Upon continued forward movement of the sheet the belts of units 63 and 64 will successively contact and grind opposite edges $g$ and $h$ of the sheet. During this time, the thrust of the glass sheet against the working runs of the belts flexes or twists the glass contacting portions thereof into the positions shown at 160–161 where they are substantially parallel with the edges being ground. At the same time, the tendency of these portions of the belts to return to their normal or diagonal positions relative to the sheet edges will maintain them in intimate contact therewith, and assure full grinding action, regardless of whether the belts are acting on an edge that is straight, curved or of other longitudinal contour. This same tendency of the working runs of the belts to regain their normal angled positions, will cause them to maintain engagement with the following corner areas $j$ and $k$ of the sheet as indicated at $l$ and $m$ in FIG. 13, to grind the same as the end of the sheet approaches and moves past the belts.

As pointed out above, the abrasive belt grinding tool of this invention, when properly mounted and positioned, will operate in the manner just described to produce and/or finish both longitudinal side and corner edge areas of the desired type, even on unusually large or irregularly sized and shaped sheets.

As the abrasive belts are contacted by successively different portions of the sheet edges, they will be subjected to two different and independent movements which greatly facilitate and improve the grinding operation. More specifically, the belts will be caused to swing bodily inwardly and outwardly, depending upon the outline of the sheet edge, about a horizontal axis and, at the same time, will be free to slide along the length of the drive pulleys 68.

With particular reference to FIG. 5, as the abrasive belt moves along the longitudinal sheet edge, the belt will be free to swing outwardly to the full line position and then inwardly to the position indicated in broken lines. Simultaneously with this swinging movement of the belt, the said belt will be free to slide vertically along the drive pulley 68, as indicated in FIG. 7. This sliding movement is caused by the balancing action of the frame 77 which produces the desired amount of pressure of the belts on the edges of the glass sheet. This induces an upward thrust on the working run 72 of the belt with resulting sliding of the outer loop of the belt along the drive pulley. Thus, when the glass sheets first engage the belts, the initial thrust of the sheet on the belts will be insufficient to swing the entire weight of the unit bodily about its horizontal axis and at this time the belt will quickly respond to the thrust of the sheet and slide along the inclined pulley until the thrust becomes of such magnitude as to swing the entire unit outwardly. The belt will continue to move up and down along the pulley simultaneous with bodily swinging movement of the unit subject to variations in the thrust of the sheet upon the belt which, in turn, is dependent upon and controlled by the outline of the sheet edge. When the pressure of the upward thrust on the belt is removed or lessened the outer loop of the belt will be permitted to return to normal position. Both the swinging movement and the sliding movement of the belt will be controlled by the outline of the sheet.

As pointed out above, as the working runs of the belts move outwardly and away from the ground corners of the sheets they will carry with them the glass particles removed from the sheet edges. This direction of movement of the belts is extremely important in preventing ground off particles of glass from becoming lodged on the flat surfaces of the glass sheets and thereby causing scratching or marring thereof. Also, there is the danger that some of such particles might find their way into the ultimate laminated product, resulting in defects therein and rejection thereof.

DESCRIPTION OF A FURTHER EMBODIMENT

In the embodiment of the invention described hereinabove and illustrated in FIGS. 1 to 14, each glass sheet S is conveyed along the conveyor means A with the longitudinal dimension thereof substantially parallel with the longitudinal axis of said conveyor means such that the opposite edges $g$ and $h$ are treated by the seaming devices H and I. However, the present invention also contemplates an apparatus by which all four edges of the glass sheets may be seamed in a continuous manner.

This further embodiment is illustrated in FIGS. 15 to 21 and comprises generally a conveyor means A1 along which the glass sheets are conveyed, with their shorter dimension substantially parallel with the longitudinal axis of said conveyor means. The sheets are moved forwardly by said conveyor means to the seaming apparatus B1 which effects the seaming of the opposite end edges e of the said sheets. Upon continued movement the sheets will be delivered to and acted upon by the sheet orienting apparatus P and turned or rotated approximately 90° and conveyed on the conveyor means A to the seaming apparatus B, which will treat the opposite longitudinal edges g and h of the sheets, as described in detail hereinabove.

Figure 15:
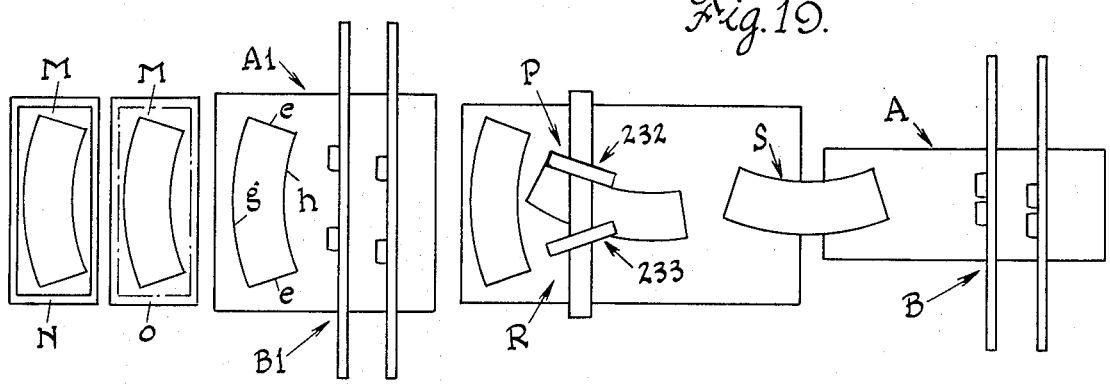
FIG. 15 is a diagrammatic plan view of a further embodiment of the invention for seaming all four edges of the glass sheets in a continuous manner.

Referring particularly to FIG. 15, a "blank" sheet of glass M is located on a cutting table N and a score line of the desired outline made therein. The scored blank is next removed to a table O on which the selvage outer areas, indicated in broken line, are broken away to give a sheet of the desired pattern to be seamed. The pattern-cut sheet is then transferred to the conveyor means A1 and delivered to the seaming apparatus B1, with the longer dimension of said sheet being transversely disposed with respect to the longitudinal axis of the conveyor to present the opposite end edges e of the sheet to the seaming apparatus B1.

In order to subsequently seam the longer side edges g and h of the glass sheet, it is necessary that the sheet be turned or oriented such that the longer dimension of the sheet will be positioned substantially parallel with the longitudinal axis of the conveyor means A. This is accomplished by the orienting means P which swings the sheet from the position indicated at the entry end of the orienting means P to the position shown as it moves onto the conveyor means A.

It is further contemplated that alternate sheets will be turned in opposite directions, as indicated in FIG. 17. This is particularly advantageous when a pair of sheets are to be processed together and it is necessary to identify each pair as they are removed from the exit end of the seaming apparatus B. Thus the first sheet S1 will be swung in a counter-clockwise direction and the second sheet S2 in the opposite or clockwise direction. The sheet orienting device will be hereinafter described in detail.

Figure 20:
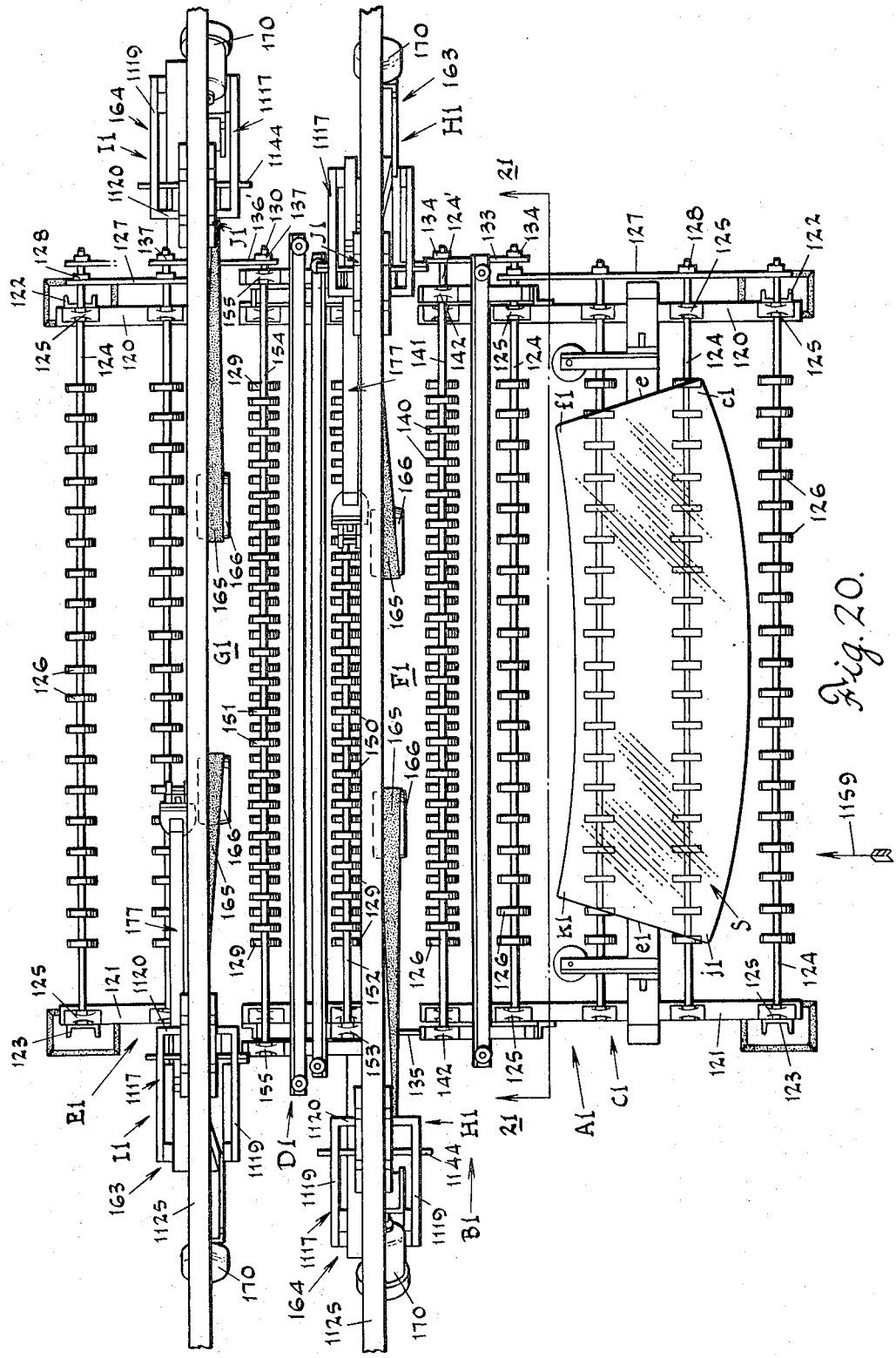
FIG. 20 is a plan view of the apparatus for seaming the opposite end edges of the glass sheets.
Figure 21:
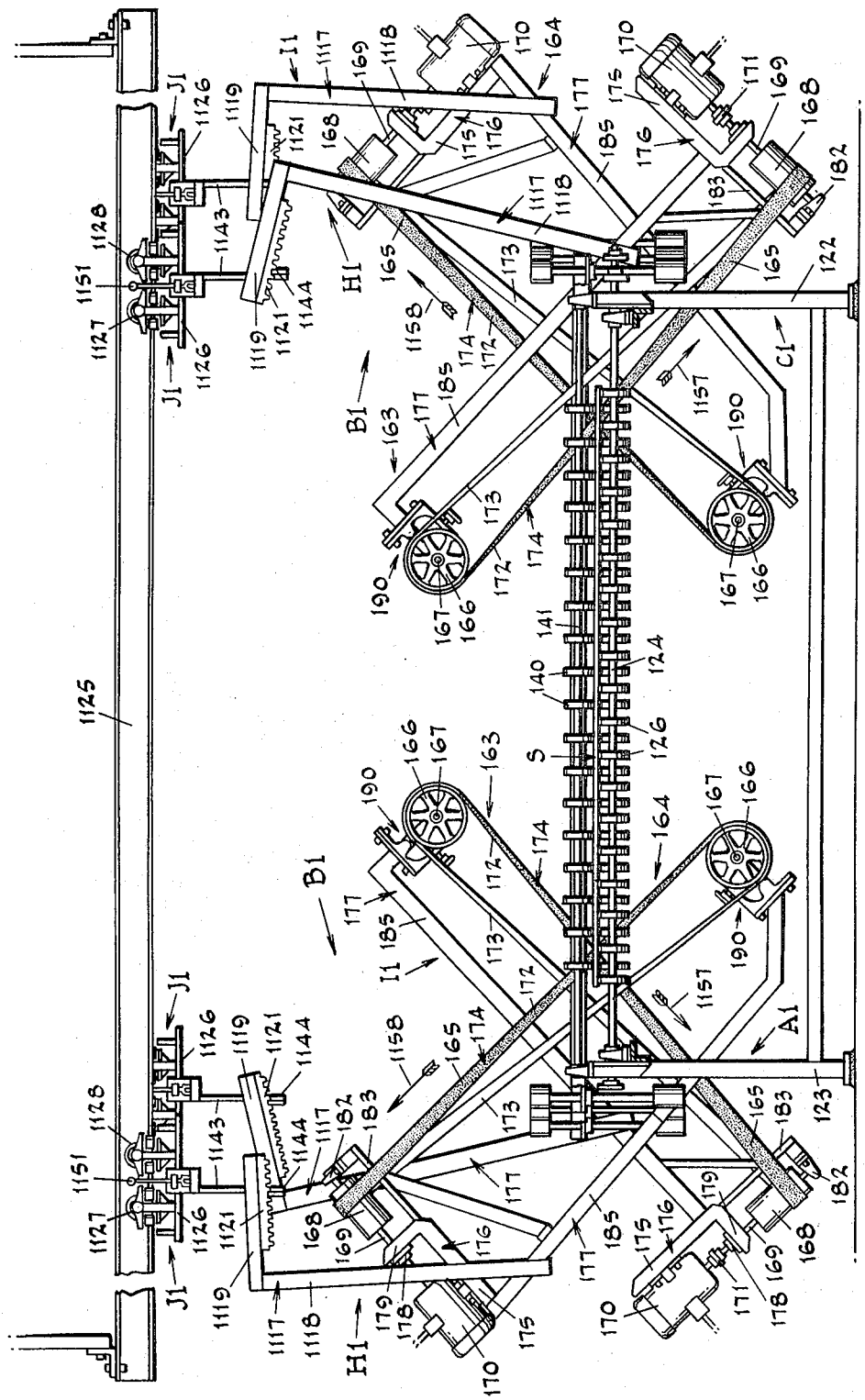
FIG. 21 is a vertical transverse section taken on line 21—21 of FIG. 20.

Referring particularly to FIGS. 20 and 21, the conveyor means A1 includes three sections C1, D1 and E1 arranged in spaced end to end relation. The first or receiving conveyor section C1 and the third or exit conveyor section E1 are of substantially the same construction, each comprising two spaced, parallel, horizontal rails 120 and 121 supported at their opposite ends by posts 122 and 123. Extending transversely between the rails 120 and 121 are a plurality of shafts 124, journaled at their opposite ends in bearings 125 carried by said rails and having fixed thereto a plurality of spaced disks 126 for supporting and conveying the glass sheets. The shafts 124 of each conveyor section C1 and E1 may be driven in any suitable manner, such as by an endless chain 127 trained over sprocket gears 128 keyed to one end of the shafts 124 and connected by suitable means to a drive motor (not shown).

The middle or intermediate conveyor section D1 is spaced from both the entry and exit conveyor sections C1 and E1 to provide open areas F1 and G1 for receiving the seaming apparatus B1. The intermediate conveyor section D1 is constructed in much the same way as conveyor sections C1 and E1 in that it also includes spaced disks 129 fixed to transverse shafts 130 for receiving the glass sheets from conveyor section C1 and delivering them to conveyor section E1.

The inner endmost shaft 124' of the receiving conveyor section C1 is driven by chain 133 trained about sprocket gears 134 (FIG. 20) on said shaft 124'. The adjacent shaft of the middle conveyor section D1 is driven by a chain 135. This shaft of section D1 then drives the associated shaft 130 by means of a chain. A chain 136' trained about suitable sprocket gears 137, one of which is mounted on the shaft 130 and the adjacent or first shaft 124 of the exit conveyor section E1.

Above the disks 126 on the shaft 124' of receiving conveyor section C1 and the disks 129 on the shafts 130 of middle conveyor section D1, there are provided disks that are adapted to hold the glass sheets S firmly on the conveyor disks 126 and 129 therebelow. Thus, a plurality of disks 140 are fixed on a transversely disposed shaft 141 journaled at its ends in the bearings 142. The manner of mounting the bearings 142 is the same as that for mounting the previously described bearings 42 for the shaft 41. Likewise, the mounting of the "hold-down" disks 150 and 151 of the middle conveyor section D1 is the same as for the "hold-down" disks 50 and 51.

"Hold-down" disks 150 and 151 are also positioned above the disks 129 on the shafts 130 of conveyor section D1, the disks 150 being fixed on a shaft 152 journaled at its ends in bearings 153. Similarly, the disks 151 are mounted on a shaft 154 journaled in bearings 155. With this relationship of the hold-down disks 140, 150 and 151, the glass sheets will be firmly held against inadvertent lateral slipping while being acted upon by the seaming devices H1 and I1 of the apparatus B1.

The seaming apparatus B1 comprises a pair of seaming devices H1 and I1 located at each side of the conveyor means A1 and positioned to operate within the open areas F1 and G1 of the conveyor means. Each pair of seaming devices includes two seaming units 163 and 164, one being adapted to seam the upper corner of the adjacent peripheral edge of the glass sheet and the other the lower corner of the same edge of the sheet.

As in the case of the seaming units H and I, each seaming unit H1 and I1 employs an endless, flexible abrasive belt 165 for performing the seaming operation. The inner loop of the belt is trained about a pulley 166 fixed to a horizontal shaft 167 vertically spaced from the conveyor A1 inwardly of the side edges thereof, while the outer loop of the belt is trained about a pulley 168 keyed to a shaft 169 located at the side of the conveyor and arranged at an angle inclined to the vertical. The pulley 166 is ordinarily an idler pulley, while the pulley 168 is driven from a motor 170 connected to the pulley shaft 169 by a suitable coupling 171.

The belt 165 may, like the belts 65 described above, be of canvas or other tough, flexible material trained about the spaced pulleys 166 and 168 to provide a working run 172 and a return run 173, and has its outside surface 174 coated with a suitable abrasive.

The motor 170 is mounted on the leg 175 of an L-shaped bracket 176 forming an integral part of a structural frame 177, while the pulley shaft 169 is journaled in a bearing 178 at one end in the leg 179 of said L-shaped bracket. The opposite end of shaft 169 is journaled in a bearing 182 secured to the outer end of an arm 183 which is attached at its opposite end to the said L-shaped bracket 176.

The abrasive belt support means also includes an elongated support bar or "boom" 185, forming a part of the structural frame 177, and secured at one end to the L-shaped bracket 176, as previously described in connection with FIGS. 8 and 9. The mounting 190 for the pulley 166 is also identical to the aforementioned pulley 66.

Fixed to the support bar 185 is one end of a substantially vertical hanger member 1117 having parallel legs 1118, the upper ends of which are formed integrally with legs 1119 extending at right angles thereto and connected by a cross-bar 1120. The under surface of each leg 1119 is equipped with a length of gear rack 1121. The hanger member 1117 is suspended from a support carriage J1 hung from the horizontal I-beam 1125 mounted transversely above the conveyor A1 from overhead beams or the like.

The supporting carriage J1 is of the same construction as carriage J described above, and comprises generally a base plate 1126 on which are mounted two spaced pairs of rollers 1127–1128 riding on the flanges of I-beams 1125. Between the side plates of the base plate 1126 is located a vertically disposed plate 1143 having a horizontal bar 1144 at the lower end thereof extending outwardly from both sides.

In mounting the hanger member 1117, selected teeth of the gear rack 1121 are engaged with the end of the bar 1144 such that the hanger members 1117 will be suitably balanced to dispose the respective frame 177 at the proper angle for orientation of the abrasive belt 165 with respect to the corner of the glass sheet. With this type of mounting, the frames will be free to swing as a pendulum while the abrasive belts are actively engaged with the corners of the sheet edges.

The carriages J1 are also movable along the I-beams 1125 by the pairs of rollers 1127–1128 to move the seaming devices closer to, or away from, the conveyor according to the size of the glass sheets to be seamed. The carriages can be secured or released for movement by use of the toggle clamps 1151.

The abrasive belts 165 are driven by the pulleys 168 in the directions indicated by the arrows 1157 and 1158 in FIG. 21. More particularly, the belts are driven in such directions that the working runs of said belts engaging the upper corners of the sheet edges move downwardly and outwardly away from the sheet, while the working runs of the belts engaging the lower corners of the sheet edges move upwardly and outwardly away from the sheet. The advantages of driving the respective belts in the directions above described have been fully set forth above in the description of the preferred embodiment of the invention.

The abrasive belts 165, like the belts 65 of seaming apparatus B, are cross-lapped in passing around the pulleys 166 and 168 so that the working faces of the working runs of the belts are normally disposed diagonally of the path of travel of the sheets. As the glass sheet moves forwardly, as indicated by the arrow 1159 in FIG. 20, the angled width of the working run of the belt 165 of unit 163 will be contacted first by the curved corner area f1 causing the flexible belt to conform to said corner area. Simultaneously, the belt 165 of seaming unit 164 will engage the leading corner area k1 of the sheet. Upon continued forward movement of the sheet, the belts of units 163 and 164 will successively contact and grind the opposite end edges e and e1 respectively of said sheet as well as the following corner areas c1 and j1. During grinding of the sheet edges, the belts move freely inwardly or outwardly to follow the edges of the sheet, while simultaneously, the belts can slide along the pulleys 168 in the same manner as the abrasive belts 65 of seaming apparatus B, as described above.

Figure 18:
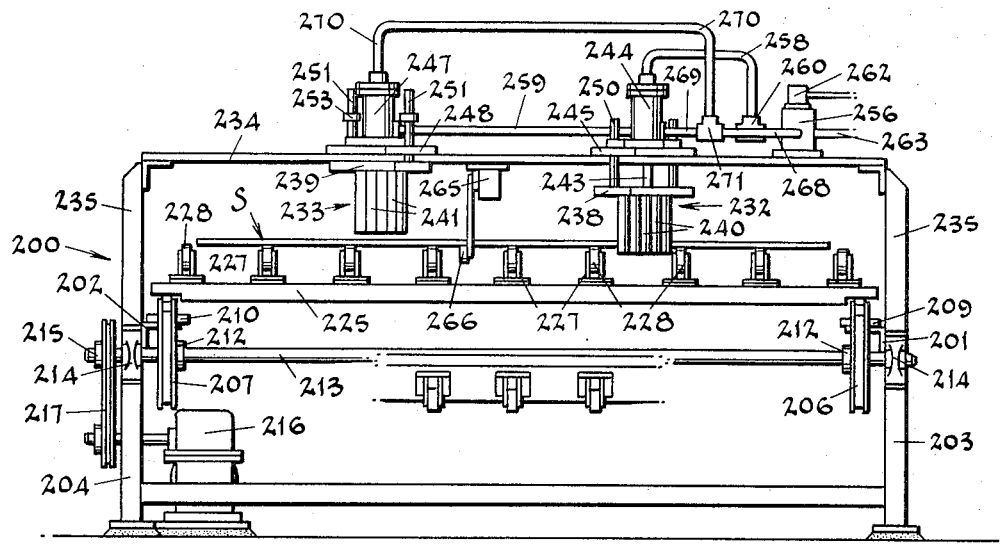
FIG. 18 is an end view of the sheet turning apparatus.
Figure 19:
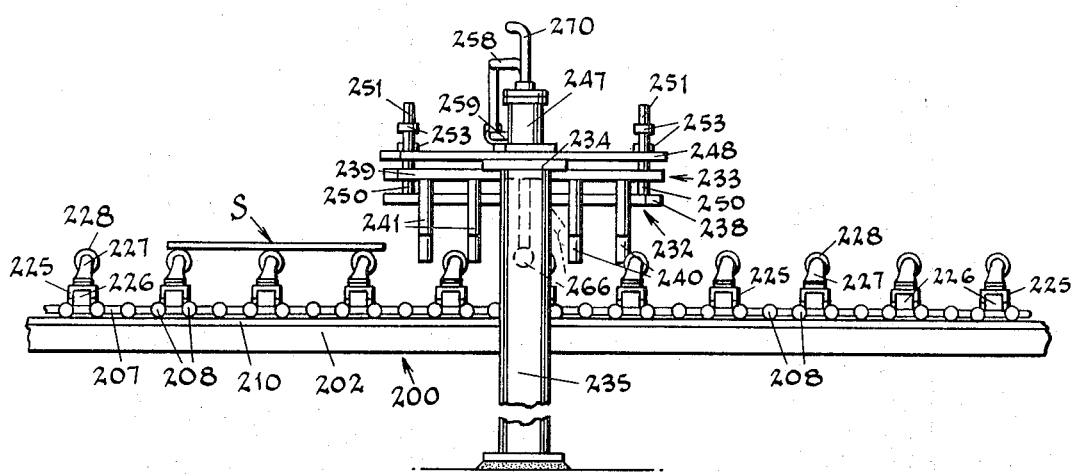
FIG. 19 is a fragmentary side view of the sheet turning apparatus.

After the end edges e and e1 of the glass sheet S have been seamed, the sheet moves from the conveyor A1 to the sheet orienting apparatus P illustrated in FIGS. 16, 18 and 19. This apparatus comprises a conveyor means R for receiving the sheet from the conveyor A1, said conveyor means R including a framework 200 formed by spaced horizontally disposed, longitudinally arranged bars 201 and 202 connected at their respective upper ends to vertically disposed posts 203 and 204.

The conveyor means is formed by endless chain belts 206 and 207 supported by rollers 208 on tracks 209 and 210 on the bars 201 and 202. At one of their looped ends, the chain belts are trained about similiar sprockets 212 keyed on a shaft 213 that is journaled in bearings 214 on the posts 203 (FIG. 18). One end of the shaft 213 is equipped with a sprocket 215 that is adapted to be driven from a gear unit 216 by means of a chain belt 217. The opposite looped ends of chain belts 206 and 207 are trained about sprockets similiarly mounted on a shaft 218 journaled in bearings 219 attached to the posts 204.

The sheet supporting surface of the conveyor belts 206 and 207 is formed by channel members 225 mounted at their opposite ends by blocks 226 on each of the belts and arranged in longitudinally spaced parallel relation to one another. Spaced along each of the channel members are a series of swivel-type casters 227 equipped with rollers 228. The sheet supporting surface is thus formed by the rollers 228 that are adapted to freely revolve about vertical axes afforded by the swivel action of the casters.

Vertical rotation of the rollers 228, while in supporting relation with a sheet, is produced by turning or swinging of the sheet by means of orientation devices generally designated by the numerals 232 and 233 that are supported above the conveyor R on a structural bar 234 carried at its respective ends by floor-based posts or channels 235 also secured to the bars 201 and 202. The orienting devices 232 and 233 have a plate 238 and 239 respectively to which flexible tubes 240 and 241 are connected by suitable pegs (not shown). The plate 238 (FIG.18) is attached to the lower end of piston rod 243 of a cylinder 244 mounted on the bar 234 by a fixed base 245, the device 233 having an associated cylinder 247 on a base 248.

The orienting devices are mounted to move in substantially vertical directions by pairs of guide pins 250 and 251 secured at their lower ends to the plates 238 and 239 respectively and passing through the bases 245 and 248. The extent of downward movement of the plates 238 and 239 can be adjusted by limiting collars 253, while the upper limit is reached when the plates are brought into contact with the bar 234.

As shown in FIG. 18, the tubes 240 of the device 232 are in the lower position in which the conveyed sheet will be engaged along the edge h of its "leading" side. The tubes 241 of the orienting device 233, on the other hand, are at this time located in the upper position, with their lower ends disaposed above the sheet.

As shown in FIG. 16, as the leading edge h of the advancing sheet is initially engaged by the first of the tubes 240 and then the remainder of said tubes the sheet will be progressively swung in a counter-clockwise direction through the broken line positions indicated by the letters h1, h2, as illustrated in FIG. 16. And, as the corner area of the sheet is carried beyond the last of the tubes 240, the sheet will have been oriented into a position in which the longer dimension thereof is substantially parallel with the longitudinal axis of the conveyor R and in position to be moved onto the conveyor A where the opposite longitudinal edges g and h of the sheet will be subjected to the seaming action of the seaming apparatus B.

As pointed out above, it is desirable to turn alternate glass sheets upon entering the turning apparatus P in opposite directions to keep the sheets in pairs for further handling and processing. This is shown in FIG. 17, in which the first sheet S1 is turned in a counter-clockwise direction by the orientation device 232, while the second or following sheet S2 is swung clockwise by the orientation device 233. This is accomplished by alternately raising and lowering the orientation devices 232 and 233 such that when the orientation device 232 is in lowered operating position the orientation device 233 is in position above and out of the path of travel of the sheet and vice versa.

More particularly, an electrically operated valve 256 is connected to the cylinders 244 and 247 in such a manner as to produce retraction of the piston rod 243, attached to the plate 238, and projection of the similiar piston rod associated with the plate 239. Thus, the valve 256 has a tubing piece 257 joined to the branch tubing elements 258 and 259 at the tee fitting 260. The tubing element 258 connects to the upper end of the cylinder 244, while the tubing element 259 continues to the lower end of cylinder 247. Now, when an electric control element 262 is energized the tubing 257 will be in open communication with a supply pipe 263.

Energization of the control element 262 is activated through an electric system including a switch 265 having an arm 266. This arm is disposed in the path of a glass sheet to cause timed sequences of action of the switch 265 whereby the valve 256 will carry out the above described course of operation of the cylinders 244 and 247. The valve 256 is also connected by tubing pieces 268 to tubing elements 269 and 270 at the tee fitting 271 (FIG. 16). The tubing element 269 connects to the lower end of the cylinder 244 while the tubing element continues to the upper end of the cylinder 247.

Accordingly, when the switch arm 266 is released from the trailing edge of the glass sheet, it causes the switch 265 to reverse operation of the control element 262 whereupon the valve 256 will direct pressure from the supply pipe 263 to the tubing 268 and the tubing elements 269 and 270 to the lower end of the cylinder 244 and the upper end of the cylinder 247. This reuslts in raising the tubes 240 of the orienting device 232 out of the path of travel of the next sheet while lowering the tubes 241 of orienting device 233 into position to engage the forward edge of the following sheet. Upon reversal of the operation, the orienting device 233 will be raised and the orienting device 232 lowered so that the orienting devices 232 and 233 will engage the leading edges of alternate glass sheets to turn or swing them in opposite directions as shown in FIG. 17. As above pointed out, this alternate orientation of succeeding glass sheets permits a pair of sheets to be readily identified as they are removed at the exit end of the conveyor means A of seaming apparatus B.

It will be understood, of course, that while the forms of the invention herein shown and described constitute preferred embodiments of the invention, they are not intended to illustrate all possible forms of the invention. It will also be understood that the words used are words of description rather than of limitation and that various changes may be made without departing from the spirit and scope of the invention herein disclosed.

We claim:

1. Apparatus for seaming the opposite edges of glass sheets cut to the desired outline, comprising a conveyor means for conveying the glass sheets in a definite horizontal path, a pair of seaming units positioned at each side of the conveyor means, each seaming unit including an endless, flexible abrasive belt for performing the seaming operation, said belt being disposed transversely at an angle to the conveyor means to engage one corner of the adjacent peripheral edge of the glass sheets, means for mounting the endless belts of said seaming units for free swinging movement about substantially horizontal axes independently of one another inwardly and outwardly relative to said conveyor means to cause the belts to follow the outline of the glass sheets, a pair of spaced pulleys for each abrasive belt and about which the belt is trained, one of said pulleys being mounted opposite the plane of the conveyor means and the second pulley being mounted at the side of said conveyor means, and means for driving one of said pulleys, said first pulley being mounted to rotate about a substantially horizontal axis and said second pulley being mounted to rotate about an axis inclined to the vertical, said abrasive belt being free to slide along said second pulley simultaneously with the swinging movement of the said belt.

2. Apparatus as defined in claim 1, in which the abrasive belt of one unit of each pair is positioned to engage the upper corner of the adjacent peripheral edge of the glass sheet and the abrasive belt of the other unit of the same pair is positioned to engage the lower corner of the same peripheral edge of said sheet.

3. Apparatus as defined in claim 2, in which each endless abrasive belt has a working run and a return run, and including separate means for driving said belts in a direction such that the working runs of the said belts move diagonally away from the plane of said conveyor means.

4. Apparatus as defined in claim 3, in which the means for mounting the abrasive belts for free swinging movement also includes means for moving the seaming units bodily transversely toward and away from said conveyor means.

5. Apparatus as defined in claim 1, including means for supporting the pulleys of each unit in fixed spaced relation for rotation about their respective axes, and hanger means connected to said pulley supporting means for suspending the unit for free swinging movement.

6. Apparatus as defined in claim 2, including means for suspending each seaming unit and providing a horizontal fulcrum about which said unit is free to swing toward and away from the conveyor means.

7. Apparatus as defined in claim 5, in which said hanger means includes a substantially vertical hanger member secured to the means supporting the pulleys in spaced relation, a carriage mounted above the hanger member, and interengaging means on said carriage and hanger member providing a fulcrum about which the unit is free to swing.

8. Apparatus as defined in claim 7, in which said interengaging means includes a horizontal member carried by said carriage and a gear rack carried by said hanger member.

9. Apparatus as defined in claim 7, including means for supporting said carriage for movement transversely relative to said conveyor means to adjust the position of the abrasive belt with respect to the path of travel of the glass sheet and for locking said carriage in adjusted position.

10. Apparatus as defined in claim 2, including an elongated member for supporting the pulleys of each pair in fixed spaced relation for rotation about their respective axes, a substantially vertical hanger secured at its lower end to said elongated member intermediate the ends thereof, a carriage mounted above said hanger for movement transversely of the path of travel of the glass sheets, and interengaging parts on said carriage and upper end of said hanger providing a horizontal fulcrum about which the unit is free to swing toward and away from the conveyor means.

11. Apparatus as defined in claim 10, in which each endless abrasive belt has a working run and a return run, and including separate means for driving said belts in a direction such that the working runs of the said belts move diagonally away from the plane of said conveyor means.

12. Apparatus for seaming the opposite edges of glass sheets cut to the desired outline, comprising a conveyor means for conveying the glass sheets along a substantially horizontal path, a pair of seaming units positioned at each side of said conveyor means, each seaming unit including an endless, flexible abrasive belt for performing the seaming operation, a pair of spaced pulleys for each abrasive belt and about which said belt is trained, one of said pulleys being mounted opposite the plane of the conveyor means to rotate about a substantially horizontal axes and the second pulley being mounted at the side of said conveyor means to rotate about an axis inclined to the vertical, means for supporting the endless belts of said seaming units for free swinging movement about substantially horizontal axis independently of one another inwardly and outwardly relative to said conveyor means to cause the said belts to follow the outline of the glass sheets, each abrasive belt being free to slide along its respective second pulley simultaneously with the swinging movement of the said belt.

13. Apparatus as defined in claim 12, in which the abrasive belt of one unit of each pair of seaming units is positioned to engage the upper corner of the adjacent peripheral edge of the glass sheet and the abrasive belt of the other unit of the same pair is positioned to engage the lower corner of the same peripheral edge of said sheet, each belt having a working run and a return run, and separate means for driving said belts in a direction such that the working runs of the said belts move diagonally away from the plane of said conveyor means.

14. Apparatus as defined in claim 13, including separate means for mounting each seaming unit, comprising an elongated member for supporting the pulleys of each pair in fixed spaced relation for rotation about their respective axes, a substantially vertical hanger secured at its lower end to said elongated member intermediate the ends thereof, a carriage mounted above said hanger for movement transversely of the path of travel of the glass sheets, and interengaging parts on said carriage and upper end of said hanger providing a horizontal fulcrum about which the unit is free to swing toward and away from the conveyor means.

15. Apparatus for seaming the edges of glass sheets, comprising a conveyor means for conveying the glass sheets in a definite horizontal path, a pair of seaming units positioned at one side of said conveyor means, each seaming unit including an endless, flexible abrasive belt for performing the seaming operation, said belt being disposed transversely at an angle to the conveyor means to engage one corner of the adjacent peripheral edge of the glass sheets, and means for mounting the endless belts of said seaming units for free swinging movement about substantially horizontal axes independently of one another inwardly and outwardly relative to said conveyor means to cause the belts to follow the outline of the glass sheets, a pair of spaced pulleys for each abrasive belt and about which the belt is trained, one of said pulleys being mounted opposite the plane of the conveyor means and the second pulley being mounted at the side of said conveyor means, and means for driving one of said pulleys, said first pulley being mounted to rotate about a substantially horizontal axis and said second pulley being mounted to rotate about an axis inclined to the vertical, said abrasive belt being free to slide along said second pulley simultaneously with the swinging movement of the said belt.

16. Apparatus as defined in claim 15, in which the abrasive belt of one unit of each pair is positioned to engage the upper corner of the adjacent peripheral edge of the glass sheet and the abrasive belt of the other unit of the same pair is positioned to engage the lower corner of the same peripheral edge of said sheet.

17. Apparatus as defined in claim 16, in which each endless abrasive belt has a working run and a return run, and including separate means for driving said belts in a direction such that the working runs of the said belts move diagonally away from the plane of said conveyor means.

18. Apparatus for seaming the edges of glass sheets, comprising a conveyor means for conveying the glass sheets in a definite horizontal path, a pair of seaming units positioned at one side of said conveyor means, each seaming unit including an endless, flexible abrasive belt for performing the seaming operation, said belt being disposed transversely at an angle to the conveyor means to engage one corner of the adjacent peripheral edge of the glass sheets, means for mounting the endless belts of said seaming units for free swinging movement about substantially horizontal axes independently of one another inwardly and outwardly relative to said conveyor means to cause the belts to follow the outline of the glass sheets, a second conveyor means positioned in advance of said first conveyor means, a pair of seaming units located at one side of said second conveyor means for seaming the adjacent peripheral edge of the glass sheet as said sheet is carried therepast, and sheet orienting apparatus positioned between said first and second conveyor means for turning said sheet approximately 90° in its own plane and delivering it to the said first conveyor means.

19. Apparatus as defined in claim 18, in which said sheet orienting apparatus includes means operable automatically for turning alternate glass sheets in opposite directions.

20. Apparatus for seaming the opposite edges of glass sheets cut to the desired outline, comprising a conveyor means for conveying the glass sheets in a definite horizontal path, a pair of seaming units positioned at each side of the conveyor means, each seaming unit including an endless, flexible abrasive belt for performing the seaming operation, said belt being disposed transversely at an angle to the conveyor means to engage one corner of the adjacent peripheral edge of the glass sheets, means for mounting the endless belts of said seaming units for free swinging movement about substantially horizontal axes independently of one another inwardly and outwardly relative to said conveyor means to cause the belts to follow the outline of the glass sheets, a second conveyor means located in advance of said first conveyor means, a pair of seaming units positioned at each side of the second conveyor means, each seaming unit including an endless, flexible abrasive belt for performing the seaming operation, and sheet orienting apparatus positioned between said first and second conveyor means and engageable by the sheet for turning said sheet approximately 90° in its own plane and delivering it to said first conveyor means.

21. Apparatus as defined in claim 20, in which said sheet orienting apparatus embodies means engageable by the leading edge of alternate glass sheets for turning said alternate sheets in opposite directions.

* * * * *